United States Patent [19]

Patterson

[11] 4,452,594

[45] Jun. 5, 1984

[54] TOOTHED BELT AND SPROCKET

[75] Inventor: Philip M. Patterson, Littleton, Colo.

[73] Assignee: The Gates Rubber Company, Denver, Colo.

[21] Appl. No.: 195,976

[22] Filed: Oct. 10, 1980

[51] Int. Cl.³ .......................... F16H 7/02; F16G 1/28
[52] U.S. Cl. .................................... 474/153; 474/154; 474/205
[58] Field of Search .............. 474/148, 153, 154, 205, 474/901

[56] References Cited

U.S. PATENT DOCUMENTS

| | | | |
|---|---|---|---|
| 2,934,967 | 5/1960 | Worrall, Jr. | 474/153 |
| 2,937,538 | 5/1960 | Worrall, Jr. | 474/153 |
| 3,404,576 | 10/1968 | Cicognani | 474/148 |
| 3,756,091 | 9/1973 | Miller | 474/153 |
| 3,924,481 | 12/1975 | Gregg | 474/153 |
| 3,977,265 | 8/1976 | Worley et al. | 474/153 |
| 4,016,772 | 6/1979 | Clemens et al. | 474/901 |
| 4,037,485 | 7/1977 | Hoback | 474/153 |
| 4,041,789 | 8/1977 | Hoback | 474/148 |
| 4,108,011 | 8/1978 | Gregg et al. | 474/153 |
| 4,148,225 | 4/1979 | Redmond, Jr. et al. | 474/148 |
| 4,233,852 | 11/1980 | Bruns | 474/153 |
| 4,337,056 | 6/1982 | Bruns | 474/153 |

*Primary Examiner*—John E. Murtagh
*Assistant Examiner*—Andrew Joseph Rudy
*Attorney, Agent, or Firm*—H. W. Oberg, Jr.; C. H. Castleman, Jr.; Raymond Fink

[57] ABSTRACT

A toothed belt having fore and aft tooth flank surfaces defined in cross section by arcs having radii generally equal to the pitch spacing of the belt teeth. A sprocket having teeth with fore and aft flank surfaces defined in cross section by arcs having radii generally equal to the pitch spacing of the sprocket teeth. In combination, a drive comprising the belt and sprocket as described.

20 Claims, 4 Drawing Figures

TOOTHED BELT AND SPROCKET

BACKGROUND OF THE INVENTION

The invention relates to toothed belts and sprockets but more particularly, the invention relates to belts with curvilinear fore and aft flank surfaces and sprockets for use therewith.

Toothed belts are extensively used in synchronous drives as substitutes for chain drives or gears. Unlike chains and gears that have pitch circles intersecting a gear or sprocket tooth, belt drives have a pitch line displaced from the belt and sprocket teeth and substantially located at the belt tensile member. The displaced pitch line introduces a problem of assuring good entry of a belt tooth into a belt sprocket cavity with a minimum of interference at various belt loads and sprocket diameters. The belt tooth/sprocket interference problem is compounded by belt pitch changes caused by elongation of the belt tensile member; deflection of elastomeric belt teeth; and chordal spanning of the belt tensile member at or between sprocket teeth under load. A trend in solving some of the belt tooth/sprocket fit problems under various loadings, is to go from the traditional belt tooth that has a trapezoidal cross section, to a belt tooth having fore and aft flank surfaces shaped with arcs having centers substantially confined within a belt cross section encompassing each belt tooth. Examples of belts with teeth having curvilinear fore and aft flank surfaces are taught in U.S. Pat. Nos.: 3,756,091 to Miller; 3,977,265 to Worley et al.; 3,924,481 to Gregg 4,108,011 to Gregg et al. While such belts have teeth that roll or slide into engagement with a sprocket, their design may require the fore and aft flank surfaces to form angles greater than 15 degrees with a normal to the belt tensile member; introduce belt tooth interference with a sprocket at various belt loads; or prevent the belt teeth from being of maximum possible cross section to minimize tooth deflection or impair belt ratcheting. The object of the present invention is to overcome the deficiencies of such belts.

SUMMARY OF THE INVENTION

In accordance with the invention, a belt and sprocket are provided. The belt has spaced teeth, each with fore and aft flank surfaces that are each shaped in cross section as generally an arc of a circle. The arc has a radius which, in one embodiment, substantially equals the pitch spacing of the belt teeth. The center of the arc may be located in a layer between about the belt pitch line to about an equatorial plane of land surfaces located between the spaced belt teeth.

The sprocket has spaced teeth, each with fore and aft flank surfaces interconnecting a tooth tip. The flank surfaces are formed as substantially the arc of a circle with a radius generally equal to the sprocket tooth spacing and with a center located along generally a tangent to the sprocket. A further aspect of the invention is the combination of the toothed belt in combination with the sprocket as described above wherein there is a clearance provided between the sprocket and belt tooth flank surfaces.

More detailed aspects of the invention are described with reference to the drawings, in which.

DESCRIPTION OF PREFERRED EMBODIMENTS

Figure 1:
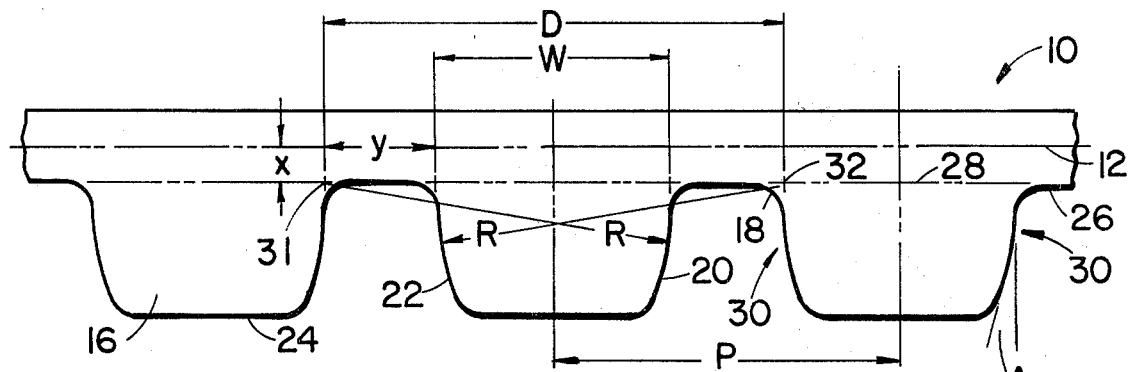
FIG. 1 is a portional edge view of a belt in accordance with the invention.

In the FIGURES, a toothed power transmission belt 10 has a general construction as is known in the art. The belt is of the type that is molded of an elastomer such as the natural rubbers, synthetic rubbers, or blends thereof, or the castable elastomers such as polyurethane. A circumferential tensile member is disposed in the body and defines a pitch line at an equatorial plane 12 around which, theoretically, bending takes place. The tensile member may be of any known type like steel cable or high modulus spiralled cord such as of fiber glass or aramid. Teeth 16 with tooth roots 18 that blend into fore and aft flank surfaces 20, 22 interconnect a tooth tip 24 and are spaced apart by their P. Land surfaces 26 between teeth are disposed along an equatorial plane 28 and blend into the tooth roots. Fibrous material may be disposed in the teeth to enhance modulus, or disposed along the tooth and land peripheral surfaces as a wear-resistant fabric and reinforcement.

In accordance with the invention, each belt tooth has at least part 30 of its fore and aft flank surfaces near its tooth roots shaped in cross section as substantially the arc of a circle with a radius R that is substantially equal to the pitch P of the belt teeth. The arcs form convex flank surface portions with centers 31, 32 located outside the confine of tooth cross section. Preferably, the centers are located in a region from about the equatorial plane 28 of the land surfaces to about the equatorial plane 12 of the pitch line. More preferably, the centers are located substantially along the equatorial plane of the land surfaces to minimize the angle A (i.e., less than 15 degrees) that the flank surfaces form with a perpendicular to the equatorial plane. By making the centers fall at the land surfaces, the flank surfaces near the tooth roots are tangent with the perpendicular so that angle A is substantially zero at the tooth root.

Figure 2:
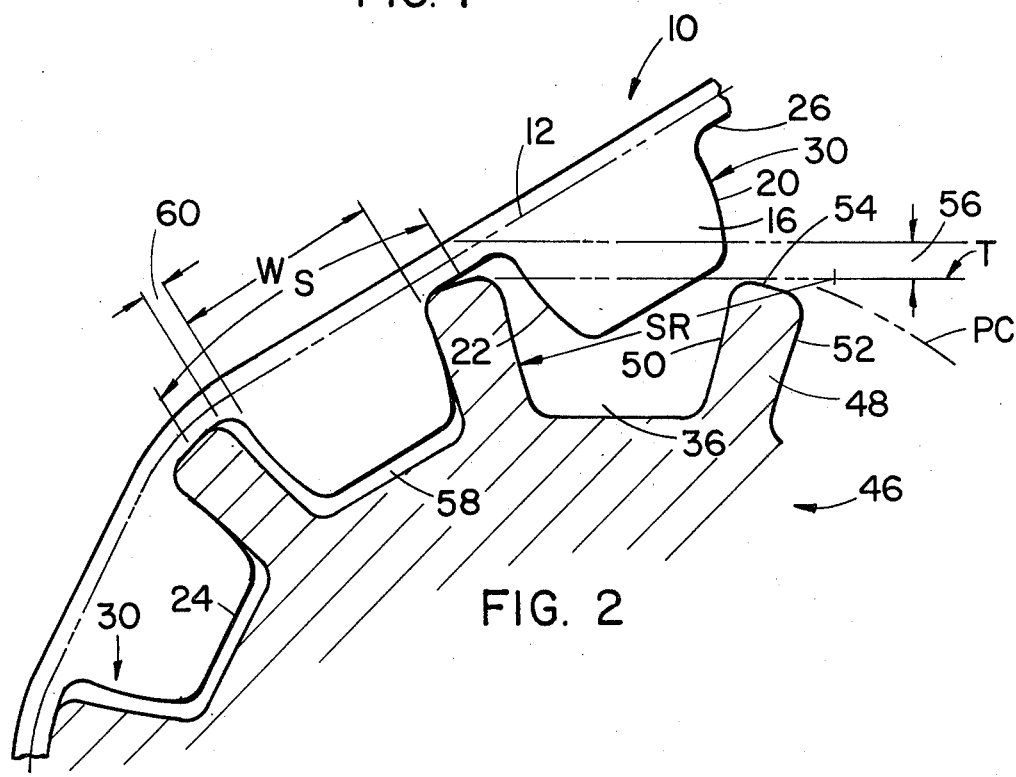
FIG. 2 is a portional side view of a sprocket in engagement with a belt as exemplified by FIG. 1.
Figure 3:
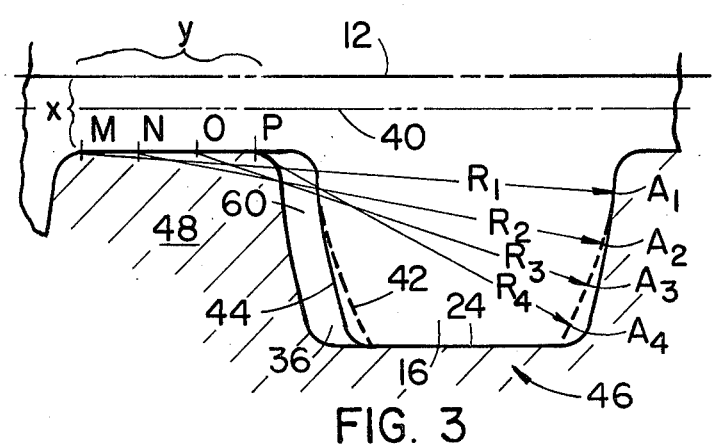
FIG. 3 is an enlarged view showing a belt tooth in engagement with a sprocket (i.e., positioned in the sprocket tooth cavity) and an alternate form of the invention.
Figure 4:
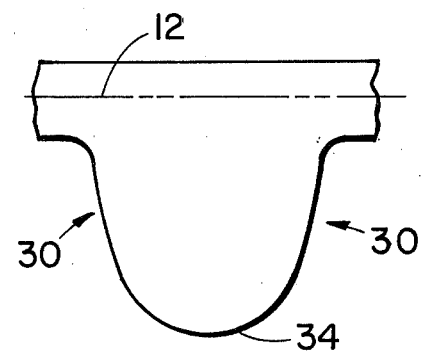
FIG. 4 is an edge view showing one belt tooth as another alternate form of the invention.

The centers for each flank surface are spaced apart a distance D that is greater than the radius R. In one embodiment, the flank radius R is substantially constant making for the fore and aft flank surfaces as substantially the arc of a circle. The fore and aft flank surfaces of each tooth blend into a tooth tip 24 that may be substantially flat as shown in FIGS. 1 through 3 or curvilinear 34 as shown in FIG. 4. In either case, the belt teeth have a desired width W and flank surfaces at a minimum angle A for enhanced antiratcheting qualities.

The shape of the fore and aft flank surfaces of each belt tooth in accordance with the invention is based on a theory that is primarily described with reference to FIG. 3. As a belt tooth moves into a sprocket cavity 36, the belt bends between successive belt teeth in a region between substantially bound by XY. Chordal bending occurs for three possible sprocket configurations which are: (1) where the tip of the belt tooth bottoms in the sprocket cavity leaving clearance between the belt land and sprocket tooth tip; (2) where the belt tooth tip bottoms in the sprocket cavity and the sprocket tooth tip bottoms against the belt land (per FIG. 3); and (3) where there is clearance between the belt tooth tip and the sprocket tooth tip bottoms against the belt land (per FIG. 2). The sprocket tooth initially contacts the belt at point M where belt pivoting or belt bending starts to take place. Bending may occur anywhere from the land surface at point M to the pitch line as indicated at X. The belt tooth, having a flank surface arcuate portion A1 of radius R1 with a center at M, will freely enter the sprocket cavity. The belt continues entering the sprocket to a new point N while chordally bending. Again, an arcuate flank surface portion A2 having a radius R2 and a center at N will be assured of entering the sprocket cavity while clearing the sprocket tooth. Similarly, the same is true for points O and P with radii R3 and R4 that define arcuate portions A3 and A4 respectively. Thus, the fore and aft flank surfaces may be generated by loci of arcs whose radii successively decrease from the initial radius R1 to that of R4 and whose centers successively and correspondingly move together along a chosen equatorial plane such as 26 or 40 of the belt within the area designated by XY. A flank surface so generated is represented by line 42.

In case (1) where the sprocket tooth tip does not contact the land portion, all bending primarily takes place around a point such as represented by M because the sprocket tooth cannot contact the land portion to change the belt bending point. In such a circumstance, entire tooth flanks with arc A1 of radius of R1 easily enter the sprocket tooth cavity without interference. The flank surface so generated is represented by line 44. Note that the initial portion 46 of the flank surface near the tooth root is the same as for cases (2) and (3) and that there is only a minor difference in the flank surfaces toward the tooth tip. Since there is very little difference between the tooth flank surfaces generated by constant arc A1 or the loci of arcs A1, A2, A3, A4 it is helpful to define the tooth flank surface with an arc of fixed radius for dimensioning belt molds or sprockets. A sprocket cavity is easily enlarged to accommodate the slightly larger belt tooth.

A belt sprocket 46 is formed with a plurality of sprocket teeth 48 that are arcuately spaced apart by their pitch S as measured along a pitch circle PC. The sprocket teeth have fore and aft flank surfaces 50, 52 interconnected by a tooth tip 54. The fore and aft sprocket tooth surfaces are preferably concave. Each sprocket tooth has at least part of its fore and aft flank surfaces near its tooth tip shaped in cross section as substantially the arc of a circle having a radius SR generally equal to the arcuate spacing S. The center for each arc is located on a line from the tangent T between successive teeth to a second line parallel to the tangent T and tangent with the pitch circle as in the region 56. The sprocket tooth cavity may be deeper than the belt teeth to provide a clearance 58 with the belt tooth tip. A clearance 60 is preferably provided between the belt and sprocket teeth flank surfaces to accommodate pitch variations for manufacturing tolerances or belt elongation under load.

Similar to that as described for belt teeth, the sprocket teeth flank surface radii may successively decrease with a change in center distance (the sprocket is shown as a rack in FIG. 3). Preferably, the centers for the arcs for the sprocket teeth are located as on the tangent T so that the initial sprocket tooth surface is substantially perpendicular to the tangent T. A desired clearance between the sprocket and belt teeth may be provided by making the sprocket tooth flank arcuate radius slightly larger than the belt tooth arcuate radius. Of course, the belt tooth radius R may be chosen to generally equal the sprocket tooth radius SR. As with the belt tooth flank surface radii, it is preferred that the sprocket tooth flank arcs have a constant radius of curvature (i.e., a fixed radius).

When the belt tooth is in mesh with the sprocket, the belt teeth and sprocket teeth have their fore and aft flank surfaces characterized in cross section with arcs whose centers are outside sectors that space successive sprocket teeth.

The foregoing detailed description is made for purpose of illustration only and is not intended to limit the scope of the invention which is to be determined from the appended claims.

What is claimed is:

1. A toothed power transmission belt of the type formed with an elastomer, reinforced with a circumferential tensile member that defines a pitch line at an equatorial plane, and teeth having a width W, spaced apart by their pitch P and shaped with land surfaces at an equatorial plane that blend to tooth roots and fore and aft flank surfaces, wherein the improvement comprises:

each belt tooth having its fore and aft blank surfaces shaped in cross section as generally the arc of a circle with a radius R ranging from an initial length at each tooth root that is substantially equal to the pitch P, to a final length that is no greater than the pitch P, and where any center for the radius R is located outside the tooth cross secion and in a region from substantially the equatorial plane of the land surfaces to substantially the equatorial plane of the pitch line.

2. The toothed belt as claimed in claim 1 wherein the fore and aft flank surfaces are generated by a loci of arcs whose radii successively decrease from the initial radius R and whose centers successively and correspondingly move together along a chosen equatorial plane of the belt.

3. The toothed belt as claimed in claim 1 wherein the majority of the fore and aft flank surfaces are shaped in cross section as substantially the arc of a circle with the radius R.

4. The toothed belt as claimed in claim 1 wherein the centers for the arcs are located substantially on the equatorial plane of the land surfaces.

5. The toothed belt as claimed in claim 1 wherein the fore and aft flank surfaces at each tooth root form an angle with a perpendicular from the tensile member of no greater than 15 degrees.

6. The toothed belt as claimed in claim 1 wherein the fore and aft flank surfaces have centers spaced a distance apart that is greater than the radius R.

7. The toothed belt as claimed in claim 1 wherein the fore and aft flank surfaces of each tooth blend into a tooth tip having a curvilinear surface.

8. The toothed belt as claimed in claim 1 wherein the fore and aft flank surfaces of each tooth blend into a tooth tip having substantially a flat surface.

9. A belt sprocket formed with a plurality of sprocket teeth arcuately spaced apart by their pitch S along a pitch circle PC and each tooth with fore and aft flank surfaces interconnecting a tooth tip wherein the improvement comprises:

each sprocket tooth has its fore and aft flank surfaces shaped in cross section as generally the arc of a circle having a radius SR that is substantially equal to the arcuate spacing S, and where any center for the radius SR is in a region from substantially a tangent T with a successive tooth to a second line that is substantially tangent with the pitch circle PC and parallel with the tangent T.

10. The belt sprocket as claimed in claim 9 wherein the fore and aft flank surfaces of each tooth are substantially a loci of arcs generated by successively decreasing radii from the initial radius equalling S whose centers successively and correspondingly move together substantially along a line L that is substantially parallel to T.

11. The belt sprocket as claimed in claim 9 wherein each arc center is substantially located on a tangent T.

12. A toothed power transmission belt of the type formed with an elastomer, reinforced with a circumferential tensile member that defines a pitch line at an equatorial plane, teeth spaced apart by their pitch P and shaped with land surfaces between successive teeth at an equatorial plane that blend to tooth roots and fore and aft flank surfaces, wherein the improvement comprises:

each tooth having fore and aft convex flank surface portions shaped in cross section with arcs that have radii substantially equal to P and whose centers are outside the tooth cross section.

13. The power transmission belt as claimed in claim 12 wherein the centers are located substantially along the equatorial plane of the land surfaces.

14. In combination, a drive comprising (I) a toothed power transmission belt formed with an elastomer, reinforced with a circumferential tensile member that defines a pitch line of an equatorial plane, belt teeth each having a width W and spaced apart by their pitch P, the teeth shaped with land surfaces at an equatorial plane between belt teeth that blend to tooth roots and fore and aft flank surfaces where each belt tooth has its fore and aft flank surfaces shaped in cross section as generally the arc of a circle with a radius R ranging from an initial length at each tooth root that is substantially equal to the pitch P to a final length that is no greater than the pitch P, and where any center for the radius R is located outside the tooth cross section and in a region from substantially the equatorial plane of the land surfaces to substantially the equatorial plane of the pitch line; and (II) a belt sprocket formed with a plurality of sprocket teeth arcuately spaced apart by their pitch S along a pitch circle PC to mesh with the belt teeth, each sprocket tooth with fore and aft flank surfaces interconnecting a tooth tip having width and shaped in cross section as generally the arc of a circle having a radius SR that is substantially equal to the arcuate spacing S, and where any center for the radius SR is located in a region from substantially a tangent T with a successive tooth to a second line that is substantially tangent with the pitch circle and parallel with the tangent T.

15. The combination belt and sprocket as claimed in claim 14 wherein the belt tooth radius R generally equals the sprocket tooth radius SR.

16. The combination belt and sprocket as claimed in claim 14 wherein the center of R is substantially located on the equatorial plane of the land surfaces and the center of SR is substantially located on tangent T.

17. The combination belt and sprocket as claimed in claim 14 wherein the fore and aft flank surfaces of the belt and sprocket teeth each have a constant radius of curvature.

18. The combination belt and sprocket as claimed in claim 14 wherein the fore and aft flank surfaces of the sprocket teeth have a greater radius of curvature than the radius of curvature of the fore and aft flank surfaces of the belt teeth.

19. The combination belt and sprocket as claimed in claim 14 wherein the radii of curvature of the belt and sprocket teeth fore and aft flank surfaces successively decrease as a function of the sprocket tooth tip width.

20. A toothed power transmission belt of the type formed with an elastomer, reinforced with a circumferential tensile member that defines a pitch line at an equatorial plane, and teeth each having a width W, spaced apart by their pitch P and shaped with land surfaces at an equatorial plane that blend to tooth roots and fore and aft flank surfaces, wherein the improvement comprises:

each belt tooth having its fore and aft flank surfaces shaped in cross section as generally the arc of a circle with a radius R that is generally equal to the pitch P, and where any center for the radius R is located outside the tooth cross section from substantially the equatorial plane of the land surfaces to substantially the equatorial plane of the pitch line and;

the fore and aft flank surfaces are generated by a loci of arcs whose radii successively decrease from the initial radius R and whose centers successively and correspondingly move together along a chosen equatorial plane of the belt.

* * * * *

UNITED STATES PATENT OFFICE
CERTIFICATE OF CORRECTION

PATENT NO. : 4,452,594
DATED : June 5, 1984
INVENTOR(S) : Phillip M. Patterson

It is certified that error appears in the above-identified patent and that said Letters Patent are hereby corrected as shown below:

Column 2, line 24 reading "...spaced apart by their P."

should read "...spaced apart by their pitch P."

Column 4, line 26 reading "...blank surfaces..."

should read "... flank surfaces..."

Signed and Sealed this

Fourteenth Day of May 1985

[SEAL]

*Attest:*

DONALD J. QUIGG

*Attesting Officer*     *Acting Commissioner of Patents and Trademarks*